United States Patent
White (10) Patent No.: US 6,897,580 B2
(45) Date of Patent: May 24, 2005

(54) ANTI-VIBRATIONAL HOLDING DEVICE FOR AN ELECTRIC MOTOR

(75) Inventor: Robert White, Buehlertal (DE)

(73) Assignee: Robetr Bosch GmbH, Stuttgart (DE)

( * ) Notice: Subject to any disclaimer, the term of this patent is extended or adjusted under 35 U.S.C. 154(b) by 331 days.

(21) Appl. No.: 10/069,477

(22) PCT Filed: Jun. 15, 2001

(86) PCT No.: PCT/DE01/02232

§ 371 (c)(1),
(2), (4) Date: Jun. 4, 2002

(87) PCT Pub. No.: WO01/99256

PCT Pub. Date: Dec. 27, 2001

(65) Prior Publication Data

US 2004/0135439 A1 Jul. 15, 2004

(30) Foreign Application Priority Data

Jun. 19, 2000 (DE) .......................... 100 29 188
Jun. 13, 2001 (DE) .......................... 101 28 535

(51) Int. Cl.$^7$ ............................. H02K 5/24; F16F 15/04
(52) U.S. Cl. .................................... 310/51; 310/89
(58) Field of Search ...................... 310/154.14, 51, 310/52, 89, 58, 91; 248/604, 605, 73, 638, 675, 647; 417/423, 674, 360–365; 29/256.8; 165/121; F16F 15/04; H02K 5/24

(56) References Cited

U.S. PATENT DOCUMENTS

| | | | | |
|---|---|---|---|---|
| 4,063,060 A | | 12/1977 | Litch, III | |
| 4,161,667 A | * | 7/1979 | Buckman et al. | 310/51 |
| 4,200,257 A | * | 4/1980 | Litch, III | 248/604 |
| 4,482,124 A | * | 11/1984 | Dochterman | 248/604 |
| 5,250,866 A | * | 10/1993 | Fukui et al. | 310/154.14 |
| 5,341,871 A | * | 8/1994 | Stelzer | 165/121 |

FOREIGN PATENT DOCUMENTS

| | | |
|---|---|---|
| DE | 43 34 124 A1 | 9/1994 |
| FR | 2 435 148 A | 3/1980 |
| FR | 2 732 524 A | 10/1996 |
| FR | 2 740 625 A | 4/1997 |

* cited by examiner

Primary Examiner—Darren Schuberg
Assistant Examiner—Karen Beth Addison
(74) Attorney, Agent, or Firm—Michael J. Striker (57) ABSTRACT

The invention relates to an apparatus for vibration-insulated mounting of an electric motor (20), in particular a blower motor, having a first housing part (10), which encloses at least one pole ring (22) and magnets (24) of the electric motor (20) and has at least one opening (14, 16), through which the shaft (18) of the motor (20) reaches, and having a second housing part (54), which is embodied as a motor flange for securing the electric motor (20) to a carrier element, for instance a motor vehicle heating and/or air conditioning system, and at least partly embraces the first housing part (10) in the axial direction of the motor shaft (18).

It is proposed that on the outer circumference (26) of the first housing part (10), a plurality of radially extending, relatively flat plastic spokes (28) are provided, which engage associated, radially and axially extending recesses (57) of the second housing part (54), and which in the region of their radially outer end (32) have connecting means (36) for securing them to the second housing part (54).

14 Claims, 7 Drawing Sheets

Fig. 9

ANTI-VIBRATIONAL HOLDING DEVICE FOR AN ELECTRIC MOTOR

BACKGROUND OF THE INVENTION

The invention is based on an apparatus for vibration-insulated mounting of an electric motor, in particular a blower motor.

Blower motors for heating and air conditioning blower systems that are used in vehicles, for instance, are as a rule decoupled in terms of vibration from the vehicle, in order to reduce the transmission of structure-borne sound from the motor or blower unit to the vehicle body and hence the passenger compartment of the vehicle.

Current methods of securing such motors comprise inserting the complete motor into a plastic housing or metal housing, on which a flange is provided for connection to the air conditioning system. Normally, rubber in the form of suitably shaped rubber elements is placed between the motor and the motor housing or into the flange, in order to damp sources of vibration of the air conditioning system or the vehicle body and to suppress noise that would be irritating to the driver or his passengers in the passenger compartment of the vehicle.

A primary source of vibration in d.c. motors is the commutation. The commutation occurs when the copper windings of the armature carry current during the operation of the motor. During each revolution of the armature shaft, current is carried in each direction through the existing windings of the motor. Under the influence of a permanent magnet field, the conduction of current in the windings causes a reaction that is transmitted onward in the form of a torque pulse. The number of windings, multiplied by two and taking the rpm rate into account, is the frequency of the commutation and thus the number of torque pulses transmitted by the motor per unit of time.

Accordingly, the commutation transmits torsional vibration into the heating or air conditioning blower system in accordance with the fluctuation or variations in the torque pulses. If rubber or suitable decoupling elements of rubber are placed between the flange and the motor housing, it is assured that reduced torsional vibration pulses will be transmitted into the heating and air conditioning blower system. The rubber is a mechanical filter, which prevents excessive vibration or the penetration of elevated vibration into the heating and air conditioning system and thus brings about a partial mechanical decoupling of the components.

In actual use, various possibilities exist of using rubber elements or decoupling elements of rubber between the housing flange or between the motor and the motor housing in order to damp precisely these vibration pulses.

German Patent Disclosure DE 43 34 124 A1, for instance, discloses an apparatus for receiving an electric motor that achieves an especially low-vibration and hence noise-damping effect by providing that between the inner walls of this receiving apparatus and the outer walls, facing them, of the motor housing, at least one elastic damping element is disposed, which is braced on the walls facing one another of the receiving apparatus and the motor housing.

These elastic damping elements, which in a preferred embodiment of the apparatus of DE 43 34 124 A1 are suitably shaped rubber elements, represent increased expense for assembly and material, which unnecessarily increases the costs for such an apparatus. In particular, rubber elements and rubber damping elements represent a problem for the assembly lines in industrial production, since they can be integrated into the corresponding apparatuses only by means of time-consuming manipulating processes.

From U.S. Pat. No. 4,063,060, a retaining device for an electric motor is known in which three rotationally flexible leaf-spring-like steel retaining arms are provided, which are offset from one another by the same circumferential angle, are fastened in the manner of rays between the electric motor and the receiving housing, and are each bound by one end, with the interposition of elastic buffers, to an inlet collar that is solidly connected to the receiving housing.

Because of the three-point suspension in a single plane of the electric motor in U.S. Pat. No. 4,063,060 and the low spring constant of the retaining arms in the direction of torsion, this motor executes relatively major oscillating and tilting motions, which in the elastic elements, especially the buffers, engender shear forces that rapidly cause material fatigue and damage. The service life of this known retaining device is therefore severely limited and is inadequate for use in motor vehicles, in which the elastic elements must also absorb vibration that is caused by external impacts from the roadway on the electric motor.

SUMMARY OF THE INVENTION

The apparatus for vibration-insulated mounting of an electric motor according to the invention, as defined by the characteristics of th independent claim, has the advantage over the prior art that the vibration-insulating elements are plastic spokes, which on the one hand assure that the electric motor is decoupled in terms of vibration from a second housing part that at the same time serves as a motor flange for securing the electric motor in the vehicle. Secondly, the vibration-insulating plastic spokes of the invention take on the additional task of connecting the two housing parts—that is, the motor mount and the motor flange—to one another.

In their function, the plastic spokes of the invention represent a mechanical filter, which decouples the irritating torque pulses of the motor from the heating and air conditioning blower system, so that less vibration is transmitted to the system, and the noise level is reduced. This design has the advantage that the plastic spokes act as spring elements, without having to use rubber or rubber elements to damp the incident vibration.

Advantageous embodiments of the apparatus of the invention will become apparent from the characteristics recited in the dependent claims.

In an advantageous embodiment of the apparatus of the invention, the housing parts are of plastic. This embodiment makes a marked reduction in weight possible for the apparatus for mounting the electric motor. In particular, the housing parts can be made by injection molding, making it easy to embody additional components and carrier elements on the housing. In this way, a shaft bearing can for instance be sprayed on directly, or a mount for the brushes or corresponding choke coils can be shaped directly on the motor mount. The motor housing can also be embodied directly of plastic.

The entire apparatus of the invention can thus be manufactured, including the decoupling elements, of virtually the same material, which markedly simplifies the process of producing such motor mount apparatuses.

One embodiment that is simple to achieve and is especially advantageous is obtained if the vibration-insulating plastic spokes are sprayed directly onto the corresponding first housing part of the apparatus and thus embodied integrally with it. Then additional connecting means and the problematic transition to different materials are unnecessary.

A good vibration-insulating effect of the plastic spokes is obtained if the plastic spokes are embodied as relatively flat. For instance, trapezoidal plastic spokes, in which with increasing radial distance from the motor the axial length of the spoke surface decreases, demonstrate very good damping properties.

The damping characteristics of the vibration-insulating motor mounting according to the invention can be varied individually, for instance by way of the number and precise shaping as well as the thickness, height, radial length and conicity of the plastic spokes and adapted to the various requirements of different types of motor and various intended uses. An optimal number of plastic spokes proves for instance to be in the range from three to six, which are distributed over the circumference of a first housing part, in which the pole ring and magnets of the electric motor are for instance secured.

Plastic spokes that are designed to be soft in their transverse direction, that is, in the axial direction to the motor, enable markedly improved decoupling of the torsional torque-vibration pulses and thus prevent them from being imported into the heating and air conditioning blower system or into the vehicle body. The rigidity of the plastic spokes in the transverse direction is selected such that when the motor is running at low-frequency rpm, the torsional torque pulses are decoupled by the plastic spokes from the motor flange and the other appended parts.

A further advantageous design is given the apparatus of the invention if the plastic spokes, on each of their radial ends remote from the motor, have additional damping elements, which are essentially perpendicular to the radial direction of the plastic spokes.

By suitable configuration of these second damping elements on the ends of the plastic spokes, it is possible to favorably affect the entire damping characteristic of the spoke elements.

These smaller damping elements or spring elements, which are perpendicular to the radial primary spoke direction, assure additional damping of the sources of vibration at higher frequencies. In this way, the filtering action of the motor housing of the invention can be expanded over a wider frequency range of unwanted vibration. If these spring elements are likewise made of plastic, then they can be shaped directly, together with the radial spoke elements and the first housing part, which avoids having to mix materials and thus represents a pronounced simplification of the production process.

By way of their precise size and shape, the damping characteristic of these additional damping elements and thus of the entire apparatus of the invention can be optimized. An advantageous shaping of these second damping elements is obtained if they extend at least over the entire axial length of the radial end, remote from the motor, of the plastic spokes, so that a uniform transition between the two damping elements is obtained.

In this way it is likewise possible to provide the damping elements, on each axial end toward the second housing part, with one or more pegs, which engage suitably shaped indentations in the recess of the second housing part. These pegs are secured in the second housing part and thus assure a stable connection of the two housing parts, which nevertheless assures the desired decoupling in vibration terms of the two components (housing parts). For instance, the pegs can be riveted by ultrasound to the damping elements in the second housing part, which is a simple and secure fastening method. It is understood that all other connection options familiar to one skilled in the art, such as gluing, friction welding, or fusing are also conceivable.

To further increase the connection strength, in an advantageous embodiment of the apparatus of the invention the recesses provided in the second housing part, which receive the plastic spokes of the first housing part, can taper conically in the axial direction, that is, in the direction of the motor shaft, specifically in such a way that the width of these recesses decreases in the direction of increasing distance from the first housing part. In this way it is attained that the plastic spokes, on their side toward the second housing part, can be clamped into the recesses of the second housing part. This assures a larger bearing area between the two housing parts and thus increases the mechanical stability of the apparatus of the invention.

Still another improvement in the damping properties for the apparatus of the invention is obtained if the damping elements located on the radial ends of the plastic spokes are embraced by rubber elements. Advantageously, these rubber elements come to rest between the damping elements of the plastic spokes and the walls of the recesses of the second housing part.

BRIEF DESCRIPTION OF THE DRAWINGS

Further advantages of the apparatus of the invention can be learned from the description and the drawing.

In the drawing, exemplary embodiments of the apparatus of the invention are shown. The description, drawings and claims include numerous characteristics in combination. One skilled in the art will also consider these characteristics individually and put them together to make useful further combinations.

Shown are.

DESCRIPTION OF THE PREFERRED EMBODIMENTS

Figure 1:
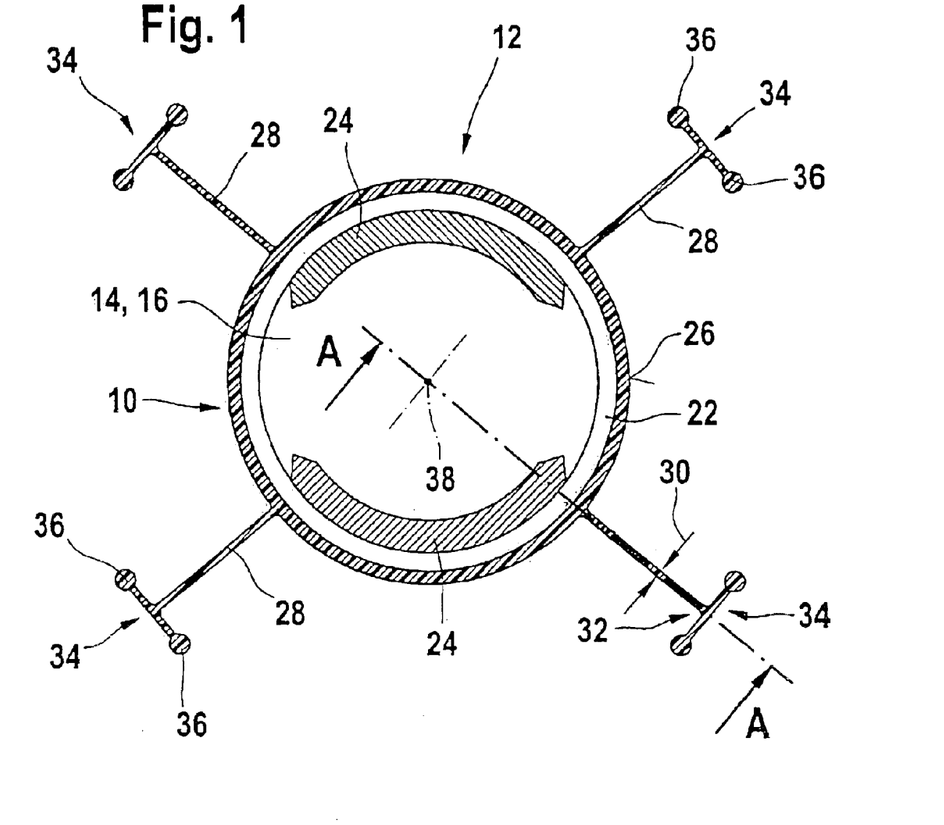
FIG. 1, a schematic plan view on a first housing part of the apparatus of the invention, in a first exemplary embodiment.

In FIG. 1, a first housing part 10 of the apparatus 12 of the invention is shown schematically. The housing part 10 in the exemplary embodiment of FIG. 1 is approximately cylindrical in shape, and on each of its axial ends it has a respective opening 14 and 16, through which a shaft 18 of an electric motor 20 can be guided out of the housing of the apparatus. The openings 14 and 16 can be closed by suitable caps, which can also comprise a different material from that of the first housing part 10. For instance, these caps can receive a brush holder part that belongs to the motor, or a bearing for the electric motor shaft, or other motor components.

A pole ring 22 and two segments of a permanent magnet 24 of the electric motor 20 of the apparatus 12 are inserted into the first housing part 10. In addition to the two-segment permanent magnet 24 shown here, it is understood that multi-pole magnets can also be used in the apparatus 12 of the invention.

On the outer circumference 26 of this housing part 10, spokes 28—in this exemplary embodiment, there are four spokes—are mounted, pointing radially away from the housing surface 26. The spokes 28 are relatively flat in shape; that is, their thickness 30 is markedly less than the corresponding radial and axial lengths of the spokes 28. This relatively flat form of the spoke elements 28 advantageously enables torsional vibration of the first housing part to be decoupled, since a corresponding deformation (torsion) of the spokes 28 is possible.

A typical size for the thickness 30 of the spokes is on the order of magnitude of 1 mm, while conversely the radial length of the spokes is higher by one order of magnitude, and typically varies within a range of from 1 to 5 cm.

The spokes 28, which for the sake of better deformability and hence better damping are of plastic, are connected, in this exemplary embodiment, solidly and integrally to the first housing part 10 and are designed as soft in their transverse extent, that is, in the direction of the motor axis. The rigidity of the plastic spokes 28 is selected in accordance with the model of the motor and the field of use, such that if the motor 20 is running at its lowest rpm, the torsional torque pulses of the motor are damped and decoupled by the plastic spokes 28. The number of spokes 28 can vary in different exemplary embodiments of the apparatus 12 of the invention and is not limited to the number disclosed in FIG. 1.

On their radial ends 32 remote from the housing 10, the spokes 28 have additional damping elements 34, which are disposed perpendicular to the radial direction of the plastic spokes 28. In addition to the plastic spokes 28, these damping elements 34 form a second mechanical filter, which decouples the vibration of the electric motor 20 from the body of a vehicle in which the apparatus of the invention is for instance accommodated.

While the plastic spokes are mechanical spring elements which primarily assure torsional decoupling, the additional damping elements 34 on the radial ends 32 of the plastic spokes 28 also enable a radial decoupling of incident motor vibration. The damping elements 34 can be embodied integrally with the plastic spokes 28, or they can be connected to the spokes 28 by other provisions familiar to one skilled in the art. Because of the special connection of the damping elements 34 to the plastic spokes 28 and their connection to the first housing part 10 of the apparatus 12 of the invention, the damping properties of the mechanical filter, which the apparatus 12 of the invention also represents in its function, among others, can be optimized.

Located on the underside of the damping elements 34 are connecting means 36, which are capable of solidly connecting the plastic spokes 28 and thus the first housing part 10 to a second housing part.

Figure 2:
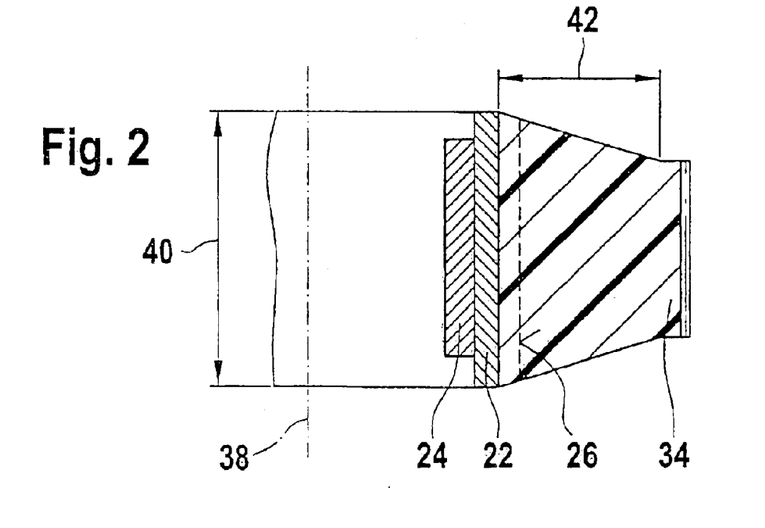
FIG. 2, a section taken along the line AA of FIG. 1.

FIG. 2 shows a schematic illustration of the plastic spokes 28, with the damping elements 34 mounted on their radial ends 32, as seen along a section AA of FIG. 1.

Also shown in FIG. 2 is a central axis 38, which is equivalent to the axis of rotation of a motor shaft of the apparatus 12 of the invention.

In FIG. 2, reference numeral 24 again designates a magnet disposed in the first housing part 10, and 22 designates the pole ring of the electric motor 20 of the apparatus 12. The parameters of the plastic spokes 28 that are considered important are their height 40, that is, their length in the direction of the motor axis; their radial length 42; the thickness 30 of the plastic spokes 28; and their conicity, or in other words the decrease in the height 40 of the spokes 28 with increasing radial distance from the wall 26 of the first housing part 10.

By way of these parameters as well as a few others, the damping properties of the plastic spokes 28 can be adapted to the particular requirements of a specialized use.

Figure 3:
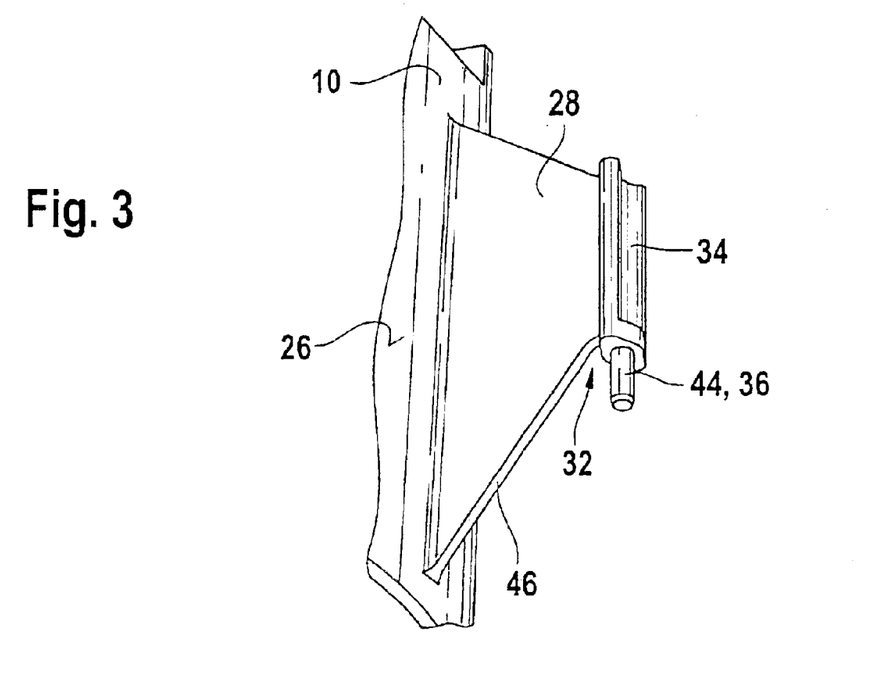
FIG. 3, a perspective view of one exemplary embodiment of a plastic spoke.

FIG. 3 shows an alternative design of the plastic spokes 28 of the invention in perspective. The plastic spoke 28 shown is shaped integrally with the first housing part 10 and has a substantially trapezoidal shape, with a decreasing height or in other words axial length with increasing radial distance from the wall 26 of the first housing part 10.

On the radial end 32 of the plastic spoke 28, an additional damping element 34 is joined to it, likewise integrally and essentially perpendicular to the radial direction of the plastic spoke 28. The material of the damping element 34 can differ from the material of the plastic spokes, in order in this way to achieve an adaptation of the damping constants to the filter function of the apparatus 12 of the invention.

On its end toward a second housing part—in FIG. 3, this is the lower end—this damping element 34 has a peg 44, which serves as a connecting means 36 for connection to further housing parts.

The connecting pegs 44 for securing the first housing part 10 to a second housing part of the apparatus 12 of the invention can alternatively be embodied instead directly on the underside 46 of the plastic spokes 28, since the damping elements 34 on the plastic spokes 28 are an optional, additional damping component, whose use in other exemplary embodiments of the invention can also be dispensed with.

Figure 4:
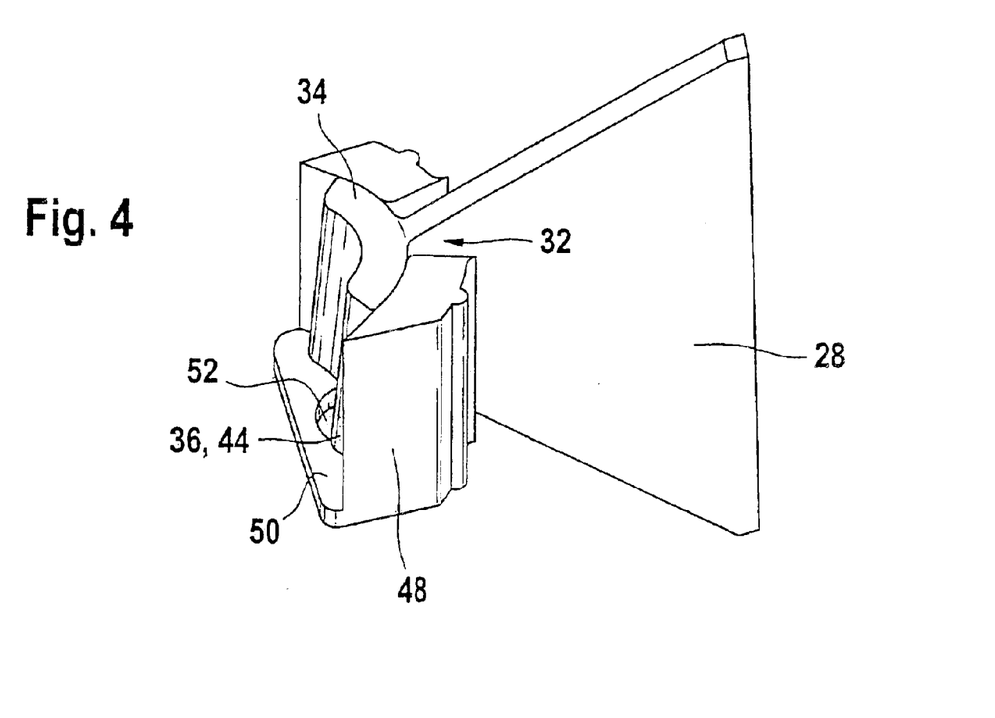
FIG. 4, an exemplary embodiment of a plastic spoke with an additional rubber element mounted on its radial end.

FIG. 4 shows a further exemplary embodiment of the plastic spokes 28 of the invention, with additional damping elements 34 on the radial ends 32 of the spokes 28. The damping element 34 shown in FIG. 4 is slightly curved outward in the circumferential direction of the housing part 10 but is disposed essentially perpendicular to the radial direction of the plastic spokes 28. The spokes 28 in this exemplary embodiment, or their radial end 32, as well as the adjoining damping elements 34, are surrounded by a common, additional rubber element 48. On its underside 50, this rubber element 48 has an opening 52, through which the respective connecting peg 44 of the spoke 28 can be passed to fasten it to a second housing part. The additional damping rubber element 48 comes to rest between the plastic spoke 28 of the first housing part 10 and a wall of a recess, receiving this spoke 28, of a second housing part.

A rubber element 48 of this kind is equivalent to a third filter, which decouples the vibration of the motor and which is disposed in terms of its action parallel to the mechanical vibration filters that the plastic spokes 28 with the damping elements 34 on their radial end 32 represent.

Figure 5:
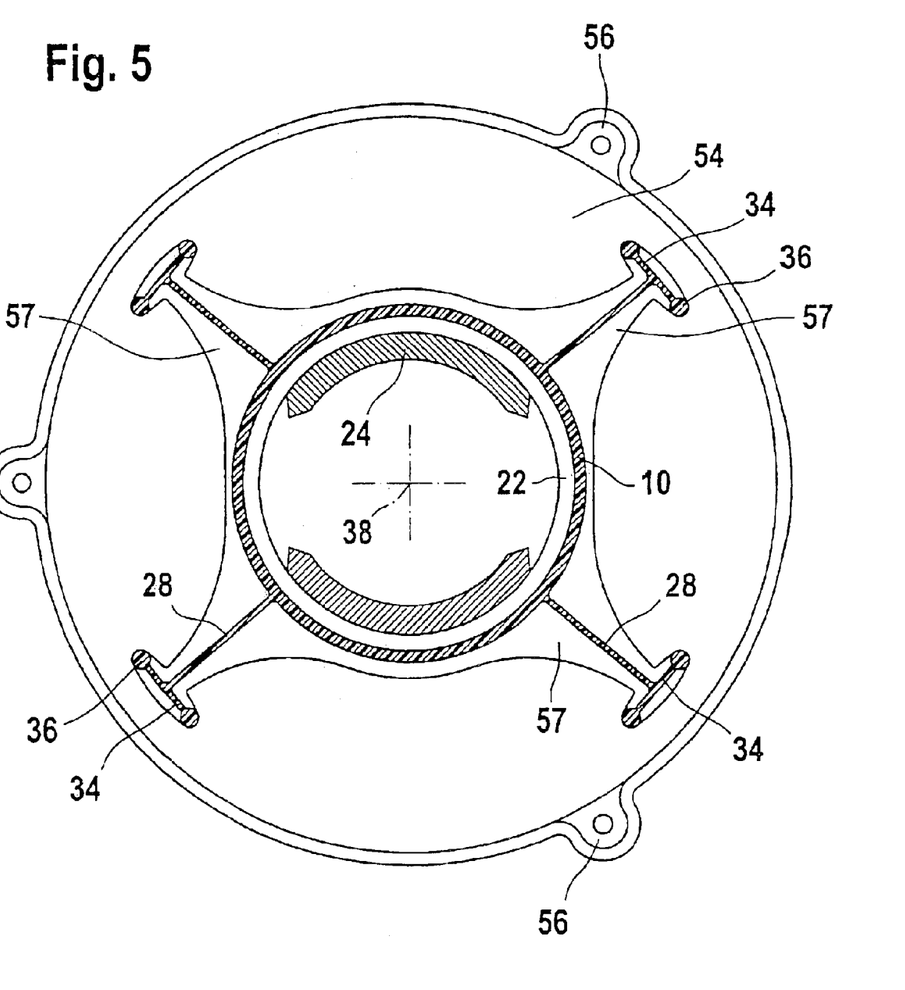
FIG. 5, a schematic plan view on the first housing part, inserted into the second housing part, of the apparatus of the invention in the first exemplary embodiment.

FIG. 5 shows a simplified schematic drawing, showing the first housing part 10 with the appended plastic spokes 28, with this first housing part inserted into a second housing part 54 of the apparatus 12 of the invention. This second housing part 54 is embodied in the form of a motor flange and carries devices 56 with which the motor flange 54 and thus the entire apparatus 12 of the invention can be mounted on a carrier element, for instance of a vehicle heating or air conditioning system.

The plastic spokes 28 of the first housing part 10 come to rest in recesses 57 of the second housing part 54 of the apparatus 12 of the invention. By way of the peglike connecting elements 36 on the underside of the damping elements 34 of the spokes 28, the first housing part 10 is solidly joined to the second housing part 54.

Figure 6:
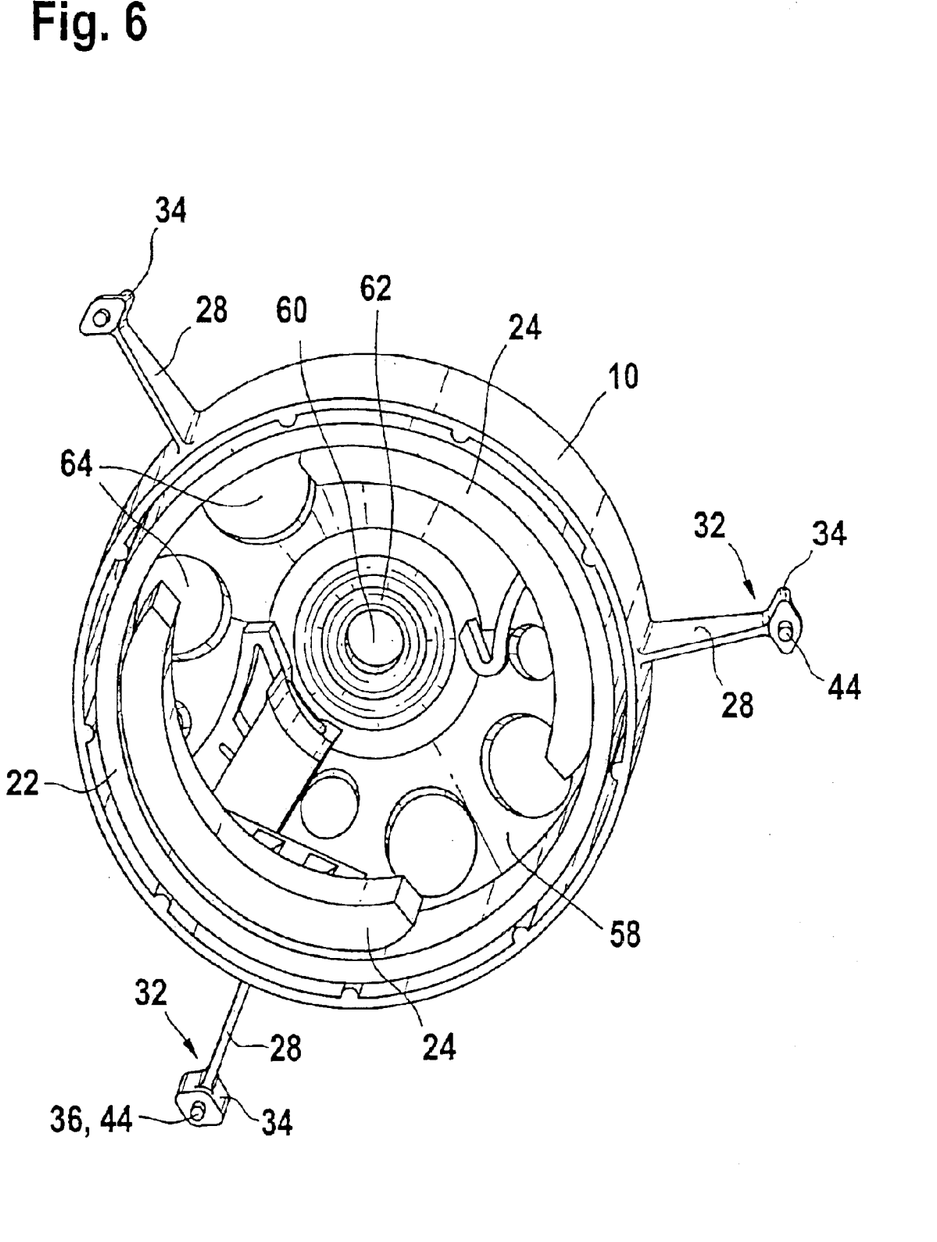
FIG. 6, a second, alternative exemplary embodiment of a first housing part of the apparatus of the invention.

FIG. 6 is a perspective view of a second exemplary embodiment of a first housing part 10 of the apparatus 12 according to the invention. The selected viewing direction is from the standpoint of the receiving second housing part. In this exemplary embodiment, the first housing part 10 has three plastic spokes 28, on whose radial ends 32, remote from the housing, damping elements 34 are mounted, analogously to those shown in FIG. 3. Also visible in FIG. 6 is a connecting peg 44 on the lower end of damping elements 32 of each of the plastic spokes 28.

In the first housing part 10 of the exemplary embodiment of the apparatus 12 of the invention shown in FIG. 6, the pole ring 22 and two magnet segments 24 can be seen. From the view through the housing 10, a housing cap 58 of the housing part 10 is also visible; in this exemplary embodiment, it is joined integrally to the first housing part. The cap 58 has a central opening 60, into which a bearing 62 for a shaft 18 of an electric motor 20 of the apparatus 12 is inserted. Other visible openings 64 in the cap 58 allow motor components to pass through them and provide for cooling of the electric motor 20.

Figure 7:
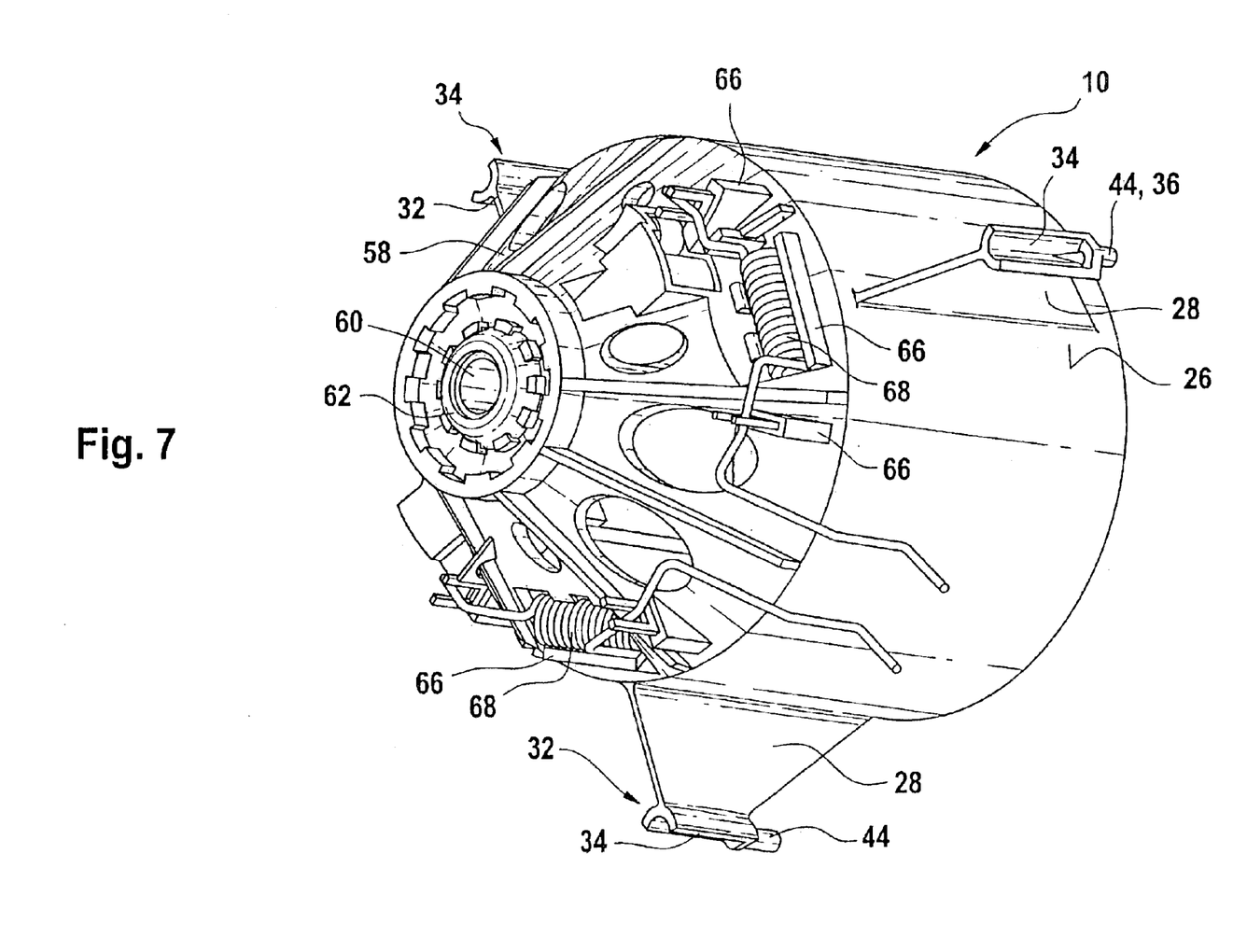
FIG. 7, a further elevation view of the second exemplary embodiment of the first housing part of the apparatus of the invention of FIG. 6.

In FIG. 7, the exemplary embodiment of FIG. 6 is shown again in a different but also perspective view, for the sake of clarification. The three plastic spokes 28, mounted on the outer circumference 26 of a first housing part 10 are clearly apparent, with additional damping elements 34 provided on their radial ends 32 and with the connecting pegs 44 for securing this housing part 10 to a further housing part. The housing cap 58, again embodied integrally in this exemplary embodiment, has various fastening elements 66 on its outside for components of the electric motor 20 of the apparatus 12 of the invention. As examples, only two choke coils 68 for the supply of electricity to the motor 20 have been shown in FIG. 7.

From this view of an exemplary embodiment of the apparatus 12 of the invention, the central opening 60, into which a bearing 62 for mounting the motor shaft 18 is inserted, can also be seen clearly.

This first housing part 10, with the electric motor 18 inserted, is thrust axially into a second housing part 54, which also serves as a motor flange, so that the second housing part 54 completely embraces the first part 10 radially and partially overlaps it axially.

Figure 8:
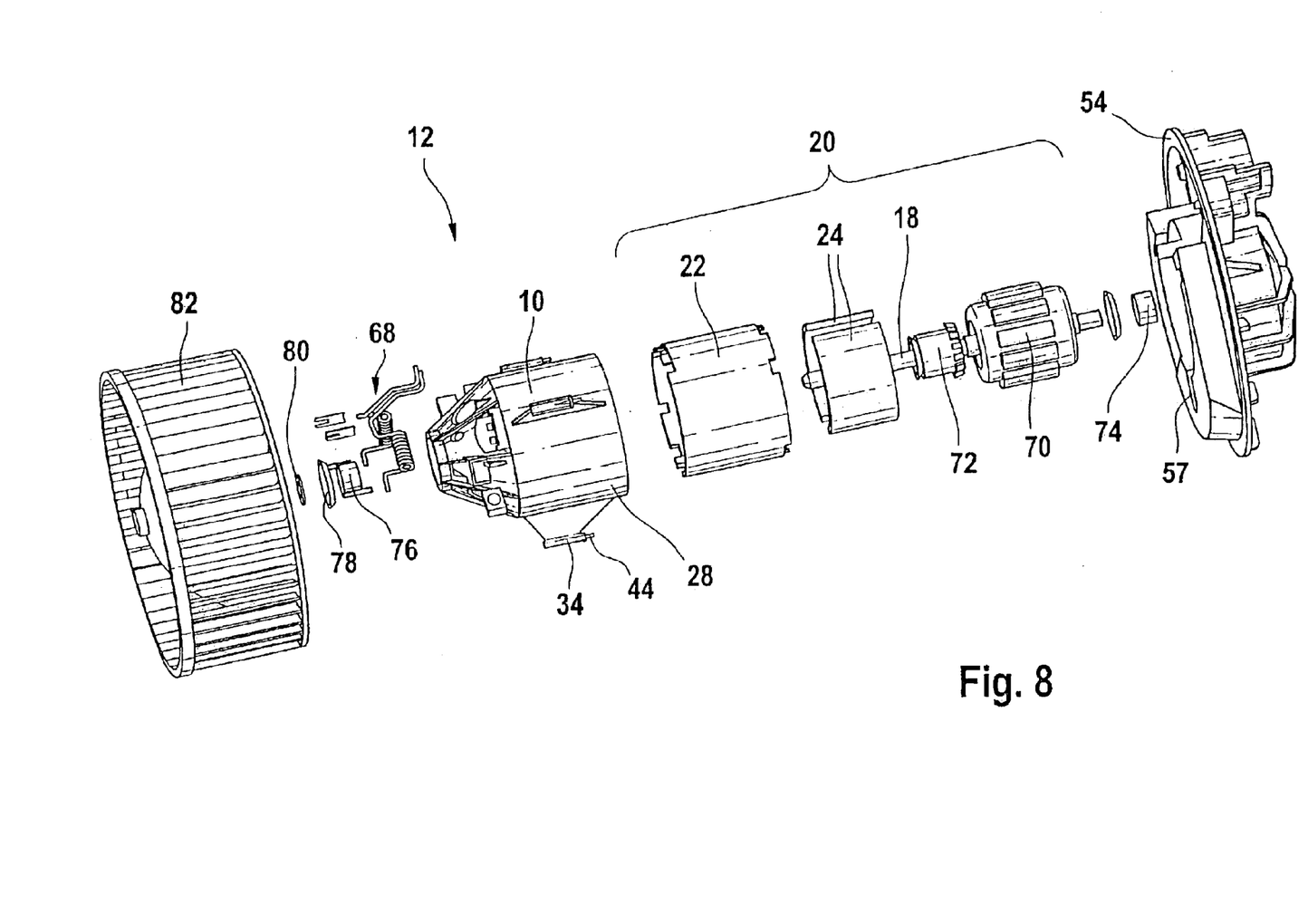
FIG. 8, an exploded view of an exemplary embodiment of the apparatus of the invention.

The cooperation between the two housing parts of this exemplary embodiment of the apparatus 12 of the invention is shown as an example in an exploded view in FIG. 8. FIG. 8 shows the essential components of an exemplary embodiment of the apparatus 12 of the invention in a simplified view. Between a second housing part 54, acting as a motor flange, and a first housing part 10, embodied as a brush holder and bearing cover unit, the essential components of an electric motor 20 of the apparatus 12 are shown. The first housing part 10 carries a pole ring 22 and two magnet segments 24 of the electric motor 20. Also shown in FIG. 8 is a motor shaft 18, with an armature 70 secured to it and with a commutator 72. For the sake of simplicity, the necessary electrical connections have not been shown but are understood to be present. The shaft 18 of the motor 20 is guided via a first bearing 74 in the second housing part 54 and via a corresponding bearing 76 in the first housing part 10, as is shown for example in FIG. 7 as well.

The motor shaft 18 protrudes outward past the first housing part 10 and is connected to a blower fan 82 via a spring washer 78 and a stop washer 80.

Figure 9:
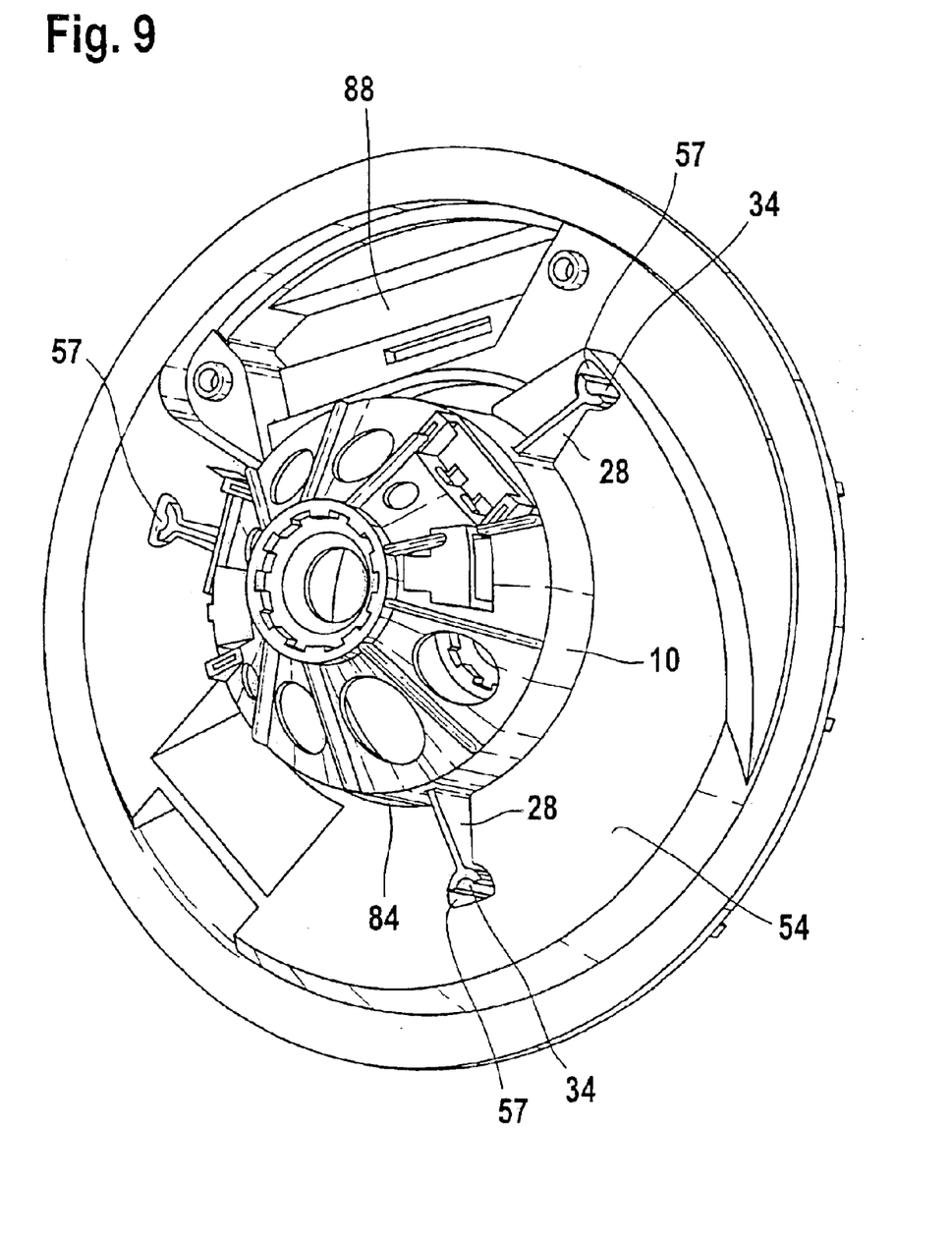
FIG. 9, a perspective view of the first and second housing parts, inserted into one another, of the apparatus of the invention in accordance with the second exemplary embodiment.

FIG. 9 shows the housing parts 10 and 54 put together; in the view shown, no electric motor is inserted into the housing. The first housing part 10 engages a central recess 84 in the second housing part 54 and in the process is partly caught in its axial terminal position by the second housing part 54. The diameter of this central recess 84 is selected such that the first housing part 10 of the apparatus 12 is still movable in this central recess 84. The plastic spokes 28 on the circumference 26 of the first housing part 10 are aligned with corresponding recesses 57 in the second housing part 54. These recesses 57 in the second housing part 54 taper conically in the axial direction, that is, the direction of the motor shaft, so that once the housing part 10 has been inserted, the plastic spokes 28 are clamped in the recesses 57 on their lower ends 46, that is, their ends toward the second housing part 54.

The second housing part 545 is embodied as a motor flange and can be connected to a carrier element, such as a vehicle body, via suitable fastening elements that are not visible in FIG. 9. In the second housing part 54, in the exemplary embodiment shown in FIG. 9, a further recess 88 is provided for a control element of the electric motor 20 of the apparatus 12 of the invention.

The apparatus of the invention is not limited to the exemplary embodiments presented in this description.

For instance, the apparatus of the invention is suitable not only for use in blower motors, but can also be used in all kinds of electric motors and electrical machines.

It is also understood that other electric motors besides the two-segment permanent magnet shown in the exemplary embodiments can be used in the apparatus of the invention.

The connection of the plastic spokes to the first housing part of the apparatus of the invention and the connection of the damping elements on the radial ends of the spokes to the spokes can also be done in other ways, familiar to one skilled in the art.

The shape of the plastic spokes according to the invention can deviate from the possibilities shown in the exemplary embodiments without departing from the patent scope claimed.

In particular, plastic spokes that have no further damping elements on their radial ends are also conceivable for the apparatus of the invention.

The connecting means of the plastic spokes to further housing parts of the apparatus of the invention is not limited to the use of the pegs presented here. It is understood that other connection possibilities can be used instead.

What is claimed is:

1. An apparatus for vibration-insulated mounting of an electric motor (20) in the form of a blower motor, comprising:
   a first housing part (10), wherein the first housing part encloses at least one pole ring (22) and magnets (24) of the electric motor (20) and has at least one opening (14, 16), wherein a shaft (18) of the motor (20) reaches through the at least one opening; and a second housing part (54), wherein the second housing part is embodied as a motor flange for securing the electric motor (20) to a carrier element and at least partly embraces the first housing part (10) in an axial direction of the motor shaft (18), wherein on the outer circumference (26) of the first housing part (10), a plurality of radially extending, relatively flat plastic spokes (28) are provided, wherein the plurality of plastic spokes engage associated, radially and axially extending recesses (57) of the second housing part (54), and wherein the plurality of plastic spokes have connecting means (36) for securing them to the second housing part (64) in a region of a radially outer end (32).

2. The apparatus of claim 1, wherein the first housing part (10) and the second housing part (54) comprise plastic.

3. The apparatus of claim 2, wherein the plastic spokes (28) are embodied integrally with the first housing part (10).

4. The apparatus of claim 1, wherein the plastic spokes (28) are shaped essentially trapezoidally, in such a way that with increasing radial distance from the motor (20), an axial length of the spokes (28) decreases.

5. The apparatus of claim 1, wherein the plastic spokes (28) are soft in a transverse direction, and the axial direction of the motor shaft (18), so that torsional torque pulses of the motor (20) are damped and decoupled from the second housing part (54).

6. The apparatus of claim 1, wherein at least three plastic spokes (28) are provided on the first housing part (10).

7. The apparatus of claim 1, wherein the plastic spokes (28), on each of a radial end (32) remote from the motor (20), have additional damping elements (34), wherein the additional damping elements are essentially perpendicular to the radial direction of the plastic spokes (28).

8. The apparatus of claim 7, wherein the additional damping elements (34) on ends of the plastic spokes (28) comprise plastic and are shaped integrally with the plastic spokes (28).

9. The apparatus of claim 8, wherein the additional damping elements (34) extend at least over an entire axial length of the radial end (32), remote from the motor, of the plastic spokes (28).

10. The apparatus of claim 7, wherein the additional damping elements (34), on each of an axial end toward the second housing part (54), have at least one axially extending connecting means (36), and at least one peg (44), wherein at least one peg engages a correspondingly shaped indentation in the recess (57) of the second housing part (54).

11. The apparatus of claim 10, wherein the at least one axially extending connecting means (36), are solidly connected to the second housing part (54).

12. The apparatus of claim 7, wherein the additional damping elements (34) are at least partly embraced by rubber elements (48), wherein the rubber elements come to rest between the damping elements (34) of the plastic spokes (28) of the first housing part (10) and the wall of the associated recess (57) in the second housing part (54).

13. The apparatus of claim 1, wherein the recesses (57) of the second housing part (54), for receiving the plastic spokes (28) of the first housing part (10), taper conically in the axial direction, so that after the two housing parts (10, 54) have been axially joined together, the plastic spokes (28) are partly clamped into the associated recesses (57).

14. The apparatus of claim 11, wherein the pegs (44) of the additional damping elements (34) are riveted to the second housing part (54).

* * * * *